Oct. 29, 1963   V. L. PEICKII ET AL   3,108,370
METHOD OF PRODUCING A FACE SEAL
Original Filed May 19, 1958
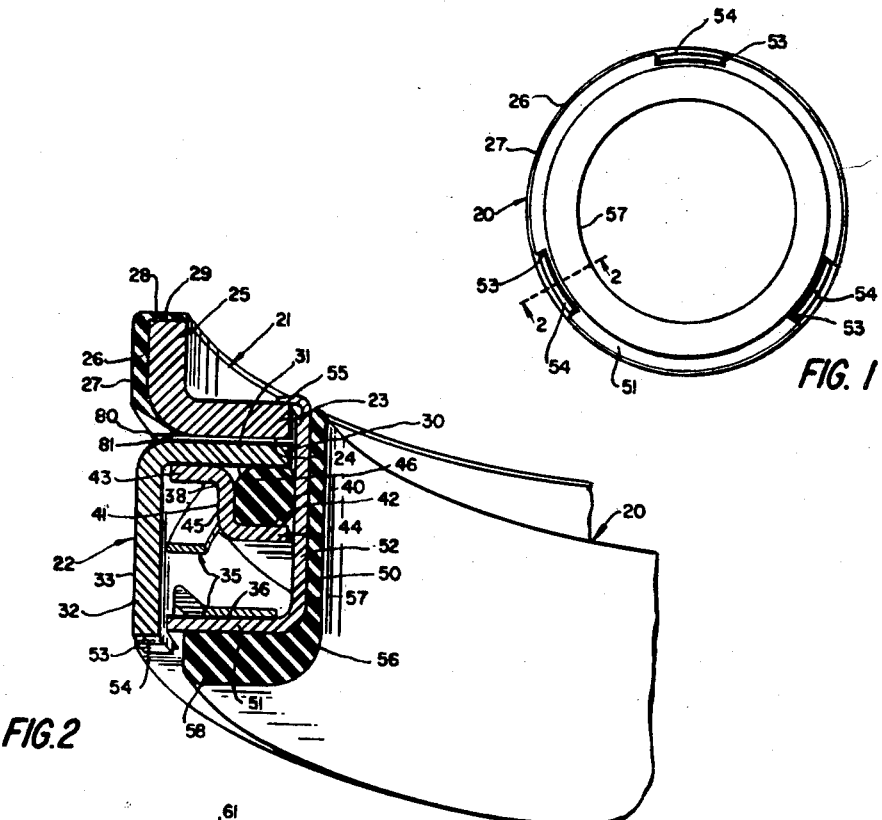
FIG. 1
FIG. 2
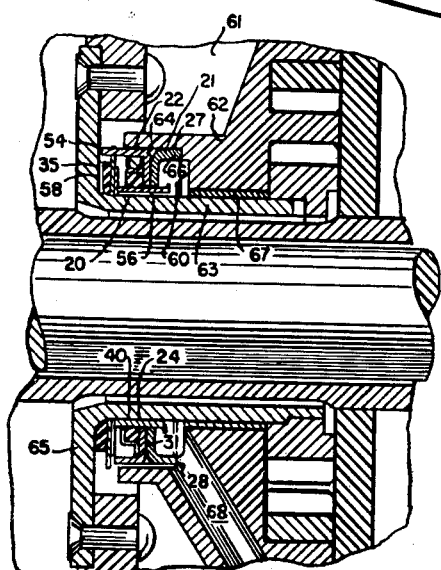
FIG. 3
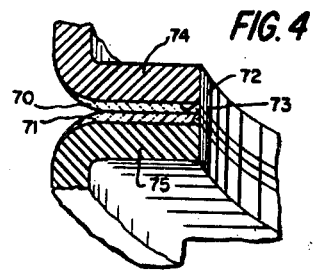
FIG. 4
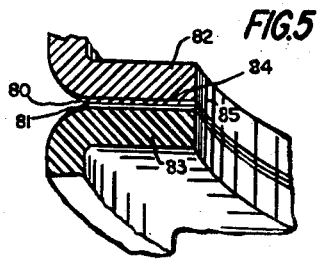
FIG. 5

United States Patent Office 3,108,370
Patented Oct. 29, 1963

3,108,370
METHOD OF PRODUCING A FACE SEAL
Vasalie L. Peickii, Hillsborough, and Joseph E. Lepetich, Los Altos, Calif., assignors to Federal-Mogul-Bower Bearings, Inc., Detroit, Mich., a corporation of Michigan
Application Mar. 30, 1959, Ser. No. 805,114, which is a division of application Ser. No. 736,100, May 19, 1958. Divided and this application Nov. 16, 1959, Ser. No. 860,056
8 Claims. (Cl. 29—529)

This invention relates to an improved method for manufacturing face seals. In particular, the invention relates to a method for making an improved mechanical seal of the face type wherein the face members are constructed from press-formed sheet metal rather than being machined from solid stock of metal, carbon, or other of the materials heretofore used in face seals. The face members resulting from the method of this invention comprise sheet metal rings with one or more axially extending flanges supporting a radial face member which is lapped, ground, or otherwise provided with a flat sealing face surface before or preferably after being coated with a wear-resistant material, the invention relates to a method for accomplishing this wear-resistant surfacing. This application is a division of application Serial No. 805,114, filed March 30, 1959, now abandoned, which was a division of application Serial No. 736,100, filed May 19, 1958, now Patent No. 2,985,475.

Mechanical seals of the face type are very efficient in providing a positive fluid seal between a housing and a relatively rotating shaft, but heretofore they have been expensive to manufacture, and their accurate installation has been tedious. Often, the sealing faces have been damaged by abrasive foreign matter getting in between the faces during or prior to installation; then the assembled faces have not sealed tightly against each other, and the dirt or other foreign matter has been ground into the faces producing permanent scratches. These are, in brief, the general problems which this invention solves.

One reason why face seals have heretofore been expensive is that the two face elements have heretofore been machined individually and from two different kinds of materials. Conventionally, one face has been machined from a thick solid piece of high-grade metal, so that both the material and its machining have been expensive. The other element has conventionally been made from less rigid material such as bearing metal or brass, or from non-metallic materials such as carbon. This less rigid element was also machined, either from solid bar stock or from specially formed rings. Wear of the mating surfaces during their relative rotation was primarily prevented by the selection of two materials with low coefficients of friction relative to each other. Lubrication by a thin film of the material being sealed is always of assistance but cannot be relied upon as the sole factor in wear prevention. The heavy metal face sealing members were either machined to provide an integral supporting portion, or the face-sealing member was mounted in a completely separate supporting member. The use of a separate metallic supporting member was general with carbon and other non-metallic faces, the carbon face element being cemented or otherwise secured to the supporting member, and this has meant that the supporting members, too, had to be carefully machined.

The present invention has solved this problem by providing a way in which both face sealing elements may be formed from the same kind of inexpensive sheet metal. Press-formed sheet steel may be formed to provide flat rings, and these rings may then be reformed to provide supporting flanges that impart a desired degree of rigidity to the radial portions that are to provide the sealing faces. In many instances it is desirable for one radial face member to have greater sectional rigidity than the other, and these different rigidities can be obtained by forming flanges of different axial length or different radial position or both. In some instances, the radial surfaces to be used as sealing faces are treated or coated with a suitable anti-friction material and then the treated or coated surface is lapped, ground, or otherwise finished until optically flat surfaces within three or four bands of helium light result. In other instances, the surfaces may instead be lapped first and then treated or coated. The invention incorporates the use of certain preferred treating or coating materials, although, as will soon be made apparent, many such materials are suitable.

The present invention provides a unitized seal, the term "unitized" being used to indicate a seal in which both face elements are assembled at the factory, together with the other elements (springs, cases, etc.) of the complete face seal so that installation of a seal merely involves insertion of a single unit in the housing bore and around the shaft. Unitization solves many problems. For example, when two face elements were installed separately (one face sometimes being a machined portion of the housing or the shaft) dirt or other foreign matter was liable to get in between them, or on one of them; then, during the initial run-in, the foreign material would scratch one or both faces and damage the seal irreparably. Also, one or both faces were sometimes directly damaged or scratched during or previous to installation. In the completely unitized face seal of the present invention, the face elements are carefully assembled, usually under oil, in carefully controlled factory conditions and, once assembled, are held together so that they will not come apart at any subsequent time. Moreover, when installed, the face seal is automatically adjusted to the proper operating position. Injury to the face sealing element prior to and during installation is prevented; proper adjustment upon installation is assured, and the product is easier to handle and gives more uniform results.

A novel method of making face seals is also provided by this invention. It reduces manufacturing costs and provides a good seal from inexpensive basic materials without running up excessive labor costs.

Among the objects of the invention are the following: to reduce the cost of manufacturing face seals; to save time and labor in manufacturing face seals; to construct a face seal wherein the face sealing elements are flanged, sheet metal rings; to provide a unitized face seal using sheet metal face elements; and to provide a novel type of sealing face incorporating sheet metal and a coating material.

Other objects and advantages of the invention will appear from the following description of some preferred embodiments of this invention. These embodiments are presented as illustrative examples and by no means exhaust the numerous practical possibilities which the invention provides.

In the drawings:

FIG. 1 is a view in end elevation of a unitized face seal embodying the principles of the present invention.

FIG. 2 is a fragmentary enlarged view in perspective and in section taken along the line 2—2 in FIG. 1. The seal is shown in the position assumed prior to installation, with the spring urging the faces together and toward the opposite end of the case.

FIG. 3 is a fragmentary view in side elevation and in section on the scale of FIG. 1 of an automotive transmission incorporating the face seal of FIGS. 1 and 2.

which is therefore shown installed in sealing relationship between a bore and a relatively rotating shaft.

FIG. 4 is a fragmentary enlarged view in perspective and in section of a portion of two face sealing flanges wherein the engaging faces are covered with a ceramic-type of wear-resistant coating material.

FIG. 5 is a view similar to FIG. 4 illustrating faces treated with a dry-film-type of wear-resistant coating.

The Seal 20 of FIGS. 1 Through 3

FIGS. 1, 2 and 3 show a unitized mechanical seal 20 incorporating two annular face-sealing elements 21 and 22, both formed from sheet metal such as press-formed sheet steel. The element 21 is stationary relative to the bore, while the element 22 rotates with the shaft relative to the bore and to the element 21. Preferably, face members 21 and 22 are formed from stampings. For example, both may be stamped from pressed sheet steel, or one may be formed from sheet brass or sheet bronze, and the other from sheet steel. But in any event, both face elements 11 and 12 are of sheet metal.

The face sealing element 21 has a radial flange 23 whose face 24 may be treated, or coated and lapped, or otherwise finished to be substantially optically flat. The surface treatment will be explained later. The radial flange 23 is reinforced by forming the element 21 to provide an axially extending cylindrical portion or axial flange 25 at the radially outer end of the flange 23. The purpose of the cylindrical portion 25 is to provide sufficient sectional rigidity so that under normal conditions of use the face 24 will not be deflected more than a pre-determined amount. For example, the amount of deflection desired may preferably lie within the range between 0.000016" and 0.000032".

Preferably, this self-reinforced face element 21 is bonded to a relatively heavy elastomeric body 26 whose cylindrical periphery 27 is calculated to fit snugly in the bore for which the seal 20 is designed. The elastomeric body 26 serves to prevent oil from leaking around the outside of element 21 and also serves to hold element 21 securely in the bore. A portion 28 of the elastomeric body 26 preferably covers the terminal edge 29 of the axial portion 25.

The other face member 22 has a radial flange 30 with a sealing face 31 (treated in a similar manner to the face 24) supported by an axially extending cylindrical portion or axial flange 32. The outer peripheral surface 33 of the axial flange 32 clears the bore, because its outer diameter is less than that of the surface 27.

Since the flange 32 is longer than the flange 25, it imparts greater sectional rigidity to the face 31 than the flange 25 imparts to the face 24. As a result, the face flange 23 is able to flex sufficiently to accommodate small deformations from the flat that may occur in the more rigid face flange 30. This may be because of changes brought about in the face flange 30 as the effects of shock during operation, wearing of the seal, or other external conditions, or conditions happening during manufacture and installation of the sealing element. The flexibility of the flange 23 relative to the flange 30 will thus maintain (under spring pressure) non-leaking face-sealing contact even though the faces 24 and 31 are not quite completely flat. However, flatness is important for they should be flat within less than 3½ light bands of helium, and it is not desirable to have either flange 23 or 30 be too flexible.

The faces 24 and 31 are urged into engagement with each other at all times by a suitable resilient compression member. The compression meber may comprise one or more coil springs, but in the present illustrative example, a finger spring 35 is shown. The spring 35 has a base member 36 from the outer periphery of which a series of fingers extend out in an axial direction. Each finger terminates in a short, substantially flat, upper end portion 38 and the slope of the fingers is preferably substantially constant. This makes it possible to obtain substantially equal pressure around the spring 35 and, within the limited distance concerned, to obtain movement directly proportional to the pressure exerted on the spring.

In addition to the face sealing members 21 and 22 and the spring 35, the seal 20 incorporates an O-ring seal 40, with associated parts, and a metal case member 50. The case 50 has a radial portion 51 from the radially inner end of which extends a cylindrical portion 52. The case 50 may, like the members 21 and 22, be made from sheet metal, but none of its surfaces are employed as face sealing elements. Its radial portion 51 may be provided with notches 53 through which projections 54 of the flange 32 extend, thereby maintaining the elements 22 and 50 in proper alignment, the torque lock this provides preventing relative rotation between them while still permitting a limited amount of relative axial motion.

The case member 50 unitizes the seal 20 when the end of its cylindrical portion 52 is turned radially outwardly to provide an end flange 55 after the elements 21 and 22, the spring 35, the O-ring 40, and its associated elements have been assembled into the case 50. While the flanges 51 and 55 prevent the parts of the seal 20 from coming out of the case 50, the elements 21 and 22 can still move freely with respect to the case 50 over a limited axial distance more than sufficient to accommodate the normal flexure expected in the installation.

The radially inner periphery of the axial portion 52 and the axially outer surface of the radial portion 51 are snugly fitted into an elastomeric lining 56, whose inner periphery 57 is adapted to fit leak-tight on the shaft upon which the seal 20 is to be installed. The lining 56 also serves to drive the case 50, so as to make it and the other parts attached to it rotate with the shaft. A leak-tight fit may be provided by molding the periphery 57 slightly undersize with respect to the shaft, the elastomer being able to give and flow sufficiently to accommodate the size differences during installation without permitting leakage after installation. The radial portion 58 of the lining 56 may serve as a bumper or guide or additional seating member for the seal during installation. Whether this portion 58 is used or not will depend upon the application for which the seal 20 is designed, but it will be obvious that it can be used to cushion the seal during installation and to prevent undesirable engagement of the projections 54.

As shown in the drawings, the base 36 of the spring 35 may be seated on the axially inner surface of the radial flange 51 of the case 50, while its upper end portions 38 urge the face 31 into contact with the face 24 for all positions of the sealing members 21 and 22.

It is, of course, necessary to prevent leakage of oil through the case 50 around the faces 24 and 31 so that oil will not leak through the clearance between the flange 55 and face member 21, through the clearance provided between the flanges 23 and 30 and the cylindrical portion 52, into the space between the case 50 and the face member 22 and out through the clearance between the projections 54 and notches 53.

The present invention solves this problem by providing an elastomeric O-ring 40 in combination with an annular, pressed-steel, keeper member 41. The keeper member 41 serves to provide an O-ring cavity 42 without any necessity for maching a groove into solid metal. The spring end portions 38 bear directly against a radial portion 43 of the stepwise keeper 41, which in turn rests against the back side of the flange 30. The radial portion 43 is connected to another radial portion 44 of the keeper ring 41 by an axial portion 45. The groove 42 is thus provided by the axial portion 45, the radial portion 44, and the radial portion 46 of the back side of the face flange 30. The spring 35 maintains the size of the groove or space 42. Thus, the spring 35 both keeps the elastomeric O-ring 40 in place and holds the two sealing faces 24 and 31 in sealing contact. When putting the seal 20 together, the faces are preferably assembled with oil or under oil. The spring 35 may be put into the case 50, the O-ring 40 and keeper 41 put in place over the spring 35, and the face element 22 inserted next, with its projections 54 extending through the notches 53. Then the other face element 21 is inserted with its face 24 in contact with the face 31. Finally, the flange 55 is turned over to lock the elements 21 and 22 into the then unitized seal 20. In its non-installed position, the spring 35 urges the rear side of the flange 23 into engagement with the case flange 55, but this is true only before installation; upon installation, the flange 23 is forced axially away from the flange 55, as will be seen presently. Thus, the two faces 24 and 31 are put into operative sealing relation from the very start, so that no foreign matter can get between them, and they remain together at all times prior to, during, and after installation.

FIG. 3 shows a typical installation of the seal 20. A portion of an automatic transmission is shown, with the seal 20 used to seal against passage of oil from a chamber 60 to the outside passage 61. The seal 20 is positioned between a stationary pump housing 62 and a shaft 63 that rotates relative to the housing 62. The housing 62 is provided with a bore 64, and installation of the seal 20 is accomplished by pushing it into the bore 64 so that its elastomeric periphery 27 seals against the bore 64. Then, the shaft 63 is inserted into the housing 62 and into the seal 20, engaging the inner elastomeric member 56 and sealing snugly. In the present instance, the pushing is continued until a flange 65 on the shaft 63 engages the rubber bumper portion 58 in a sealing relation. It will be noted that the end portion 28 snugly engages the end wall 66 of the housing bore 64, so that the spring 35 is partially compressed and the flange 23 is moved away from the flange 55. Of course, either the bore 64 or the shaft 63 may rotate, but the installation has been described as relative rotation, which is the important thing.

During rotation, oil lubricates the bearings 67, enters the chamber 60, and flows to some pump elements through a passage 68. The faces 24 and 31 seal against each other and prevent oil from leaking from the chamber 60 into the passage 61. At the same time, the O-ring 40 forms a stationary seal between the stationary casing 50 and the stationary face element 22.

*Face Coatings and Their Application*

Face coatings are necessary for these seals when cold-rolled sheet steel of drawing or commercial quality is to be used. Since there are substantial economic savings in using this relatively inexpensive material to form the face sealing elements 21 and 22, the cost of the coatings is a minor item. The coatings impart lubricity, abrasion-resistance, heat-resistance, and other qualities required when the faces operate at high speeds. Several kinds of coatings are suitable, and which one will be chosen may depend upon the type of service for which the seals are designed. For example, it makes a difference whether the seals are to operate in a lubricating medium or a non-lubricating medium, in an abrasive atmosphere, or in a normal sealing atmosphere.

One excellent type of coating is exemplified by FIG. 4 where relatively thick ceramic coatings 70 and 71 have been applied to two faces 72 and 73 of sheet metal radial flanges 74 and 75. The ceramic coatings are preferably applied to a thickness of 0.01" to 0.04" on the raw surface of the sheet metal (which usually is about 0.05" to 0.1" thick). Then the ceramic surface is lapped (or otherwise finished) to obtain an optically flat surface within 3½ light bands of helium. Flatness within 4 light bands has been found to be critical. If the faces are more than 4 light bands out of flat, they leak. The flattening operation is carried on after application of the coating material. Due to the thickness of the layers 70 and 71, a considerable amount of it may be removed in this flattening operation, if desired, usually leaving a coating thickness of from slightly less than 0.01" up to about 0.025".

There are several kinds of suitable ceramic coatings. For example, alumina (aluminum oxide), alumina with 8% titania (titanium oxide), rutile (titanium oxide with 2% iron), zirconia (zirconium oxide), and zirconium silicate are all suitable. Aluminum oxide coatings suitable for spray application are sold by the Norton Co. as "Rokide A" and by Flame Ceramics of Santa Monica, California. A similar material is sold by Metallizing Engineering Co., Inc., as "Thermospray No. 101" and comprises alumina with 8% titania. Zirconia is available from the same source as Thermospray No. 201, from the Norton Co. as "Rokide Z," and from Flame Ceramics. Zirconium silicate is sold by the Norton Co. as "Rokide ZS," and rutile is sold by Flame Ceramics. These coatings may be applied with an oxyacetylene flame and an air blast (cf. U.S. Patent No. 2,707,691).

An additional treatment that is preferred comprises application to the coating of a thermosetting or air drying resin or, as preferred by us in many instances, silicone. The resin or silicone helps provide a very hard surface and increases the bond strength by filling the pores of the ceramic so it can no longer absorb moisture which, if absorbed, would tend to corrode the base metal and thereby weaken the mechanical bond between the ceramic and the sheet metal base. Operation is enhanced by this treatment, because the filled pores cannot subseqeuntly be loaded with abrasive materials which tend to separate the sealing faces and cause leakage, or to hold the sealing faces apart and to score one of the faces, thereby causing undue wear and leakage. Particles which may get in between two filled surfaces will not find a crevice in which to lodge, and will tend to be worked out so that they will no longer cause problems. It may be noted that deposition by the oxyacetylene flame does not itself fill the pores or prevent pores from forming, as can be done with the better-known process of molding or fusing ceramics which are not generally suitable for applying face seal coatings. By filling the pores with the after-treatment, the results and problems of open pores are avoided.

In addition to ceramic coatings, it is possible to coat the sheet metal faces with certain metals such as molybdenum metal sold in a 99½% pure state as "Spraybond" by Metallizing Engineering Co., Inc., a high-chrome-content stainless steel sold by the same company as "Thermospray No. 42F" and "Metcoloy No. 2," and "Aluminum Iron Bronze" sold by the same company as "Thermospray No. 51F." These metals are applied in the same general manner as the ceramic-type coatings and to the same thickness, before lapping, but they have different properties. These metals are hard and tough. Although they are not as heat-resistant as the ceramic, they do expend and contract more uniformly with respect to the base metal and have good wear resistance. Excellent results are obtained for many seals by having one face ceramic coated and the other metal-coated.

In addition to these coatings there are also what are known as dry-film coatings, which are preferably applied after lapping the sheet metal faces. In this type the film is very thin, between 0.0003" and 0.001". As shown in FIGS. 2 and 5, the coatings 80 and 81 are applied to the flanges 23 and 30, or 82 and 83, after lapped surfaces 84 and 85 are provided. Examples of suitable coatings of this type are a suspension of molybdenum disulfide in a mixture of phenolic and vinyl resins (sold under the name "Lubelok No. 4396" by Electrofilm Co., and as "Henderlube No. 402" by W. A. Henderson Co.); a suspension of graphite in a mixture of phenolic and vinyl resins (i.g., Henderlube No. 502); and a mixture of graphite and molybdenum disulfide in a mixture of phenolic and vinyl resins (Henderlube No. 422C and Ever-lube Nos. 610A, 620A, and 818, patents 2,470,136; 2,534,406; 2,703,768). All these products are applied by spraying the material on the metal after the metal has been lapped or ground to a flat surface and preferably after the metal has been phosphate coated in a conventional manner. The sprayed material may then be cured in an oven for the time and at the temperatures specified by the manufacturer and depending on the exact resin used and the purpose for which the part is to be used.

Another type of film closely related to the dry film type, also applied to lapped sheet metal surfaces, is described in Patent 2,707,159 and is known as Lubri-Case. This surface material is applied initially as an oxygen-free sulfur salt such as molten alkali sulphide, or sulfocyanide, and the result of the process is to sulfurize the surface of the metal parts under high-temperature conditions.

As indicated earlier, the degree of flatness of sealing faces is usually expressed in the number of bands of helium light reflected through an optical flat.

*Theoretical Considerations*

There is a pressure drop due to centrifugel force across the radial distance between the inner and outer circles of engagement of a face seal, if there is a fluid between the faces. The rules of fluid mechanics apply, particularly the equation for the pressure gradient $$\frac{dp}{dr}$$

namely:

$$\frac{dp}{dr} = \frac{\rho v^2}{r}$$

where $\rho$ is the mass density of the fluid being sealed, $v$ is the velocity of the fluid along its curved path as it moves along a circle between the two relatively rotating faces, and $r$ is the radius of curvature of the fluid path, i.e., the radius of the circle along which the fluid element being considered is moving.

Since $v = \omega r$, where $\omega$ is the angular velocity, $dp = \rho \omega^2 r \, dr$, we can, then, integrate to obtain the pressure drop:

$$p_2 - p_1 = \frac{\rho \omega^2}{2}(r_2^2 - r_1^2)$$

where $r_1$ is the inner radius, $r_2$ is the outer radius, $p_1$ the pressure at the inner periphery, and $p_2$ is the pressure at the outer periphery.

There will be fluid between the faces if the average pressure, $p_{av}$, due to the fluid is in balance with the unit load applied by the spring, or other method, tending to urge the faces together or if the pressure of the fluid is greater than this. In the latter case the seal will leak. The average pressure is found by first considering $p_r$, the pressure at any radius $r$, which is given by $$p_r + p_1 + \frac{\rho \omega^2}{r}(r^2 - r_1^2)$$

The total force F due to fluid pressure is found by integrating the equation $$F = \int_{r_1}^{r_2} 2\pi r p_r \, dr$$

Substituting the preceding equation for $p_r$, we get $$F = 2\pi p_1 \int_{r_1}^{r_2} r \, dr - \pi \rho \omega^2 r_1^2 \int_{r_1}^{r_2} r \, dr + w\rho \omega^2 \int_{r_1}^{r_2} r^3 \, dr$$

$$= p_1 \pi (r_2^2 - r_1^2) - \frac{\pi \rho \omega^2 r_1^2}{2}(r_2^2 - r_1^2) + \frac{\pi \rho \omega^2}{4}(r_2^4 - r_1^4)$$

However, $$p_{av} = \frac{F}{A}$$

where A is the area over which the force is applied; and $A = \pi(r_2^2 - r_1^2)$, so:

$$p_{av} = p_1 - \frac{\rho \omega^2 r_1^2}{2} + \frac{\rho \omega^2}{4}(r_2^2 + r_1^2)$$

$$= p_1 + \frac{\rho \omega^2}{4}(r_2^2 = r_1^2)$$

If the unit load on the faces urging them together is greater than $p_{av}$, the seal will not leak, and the seal will run with only the adsorbed film for lubrication; there will not be fluid between the faces. Face seals are designed to run under this condition. Hence, the materials from which they are made are important in holding friction down and in enabling long running time without substantial wear. Moreover, if the faces are not sufficiently flat compared with the film thickness, there will be irregular gaps where leakage can occur.

This theory will be better understood by considering a specific example. Consider a face seal similar to that of FIGS. 1 and 2 encircling a shaft of 1.75 in. diameter and fitting in a 2.5 in. bore. The face has a 2.5 in. outer diameter and a 2.125 in. inner diameter. The shaft rotates at 3600 r.p.m. Lubricating oil with a specific gravity of 0.82 is used. The ambient pressure communicating with the outer radius of the seal is atmospheric pressure. Oil is assumed to fill the cavity communicating with the inner radius of the seal, with atmospheric pressure communicating with this cavity so that any pressure built up within it is due to centrifugal force. The pressure at the shaft surface is then atmospheric pressure. Centrifugal force causes a pressure $p_1$ at radius $r_1$. Atmospheric pressure will be the reference, considered as zero, so that the pressures found will be pressures above atmospheric. By an equation similar to the above, the pressure $p_1$ can be calculated as follows, where $r_s$ is the shaft radius:

$$p_1 = \frac{\rho \omega^2}{2}(r_1^2 - r_s^2) = \frac{.82 \times 62.4 \times 3600^2 \times 4^2 (1.0625^2 - .875^2)}{2 \times 32.17 \times 3600 \times 144^2}$$

$$= 1.98 \text{ p.s.i.}$$

The pressure drop across the faces, if there is a film of oil present, is obtained using the earlier given equation $$p_2 - p_1 = \frac{\rho \omega^2}{2}(r_2^2 - r_1^2)$$

$$= \frac{.82 \times 62.4 \times 3600^2 \times 4^2(1.25^2 - 1.0625^2)}{32.17 \times 3600 \times 144^2}$$

$$= 2.35 \text{ p.s.i.}$$

Therefore $p_2 = 4.33$ p.s.i. under the conditions considered.

The average pressure may be found by substituting values in an earlier given equation, $$p_{av} = 1.98 + 1.178 = 3.16 \text{ p.s.i.}$$

In the above development we have considered the oil to be inside the inner radius of the seal and the atmosphere to communicate with the outer radius. Face seals are also made to run with the oil outside the outer radius and the atmosphere communicating with the inner radius. This is sometimes advantageous because the effect of centrifugal force results in a lower pressure at the inner radius than at the outer radius if there is oil between the faces, and therefore aids sealing if the oil being sealed is outside the outer radius of the faces. For low speed applications or applications where the oil cavity is not pressurized, seals with the oil inside are entirely satisfactory, and are used in many applications where seals of this configuration are easier to make or install. However, for high speed applications or applications where the oil cavity is pressurized, seals are often made so that the oil is outside. In this case equations similar to those given are written for the average pressure and the pressure at the inner radius in terms of the pressure at the outer radius, and the pressure due to centrifugal force at that radius is calculated and used for finding the average pressure and the pressure at the inner radius from these equations.

*Theoretical Determination of Permissible Out-of-Flatness*

If there is fluid between the faces, but the seal is not leaking, the pressure in the fluid in the portion adjacent to the ambient air must be supported by the surface tension of the fluid at the meniscus which will exist. For this equilibrium condition, the thickness, $t$, of the fluid film is given by $$t = \frac{2y}{p}$$

where $y$ is the surface tension. This same equation gives the maximum gap that can be tolerated between the faces under given condition, if leakage is to be prevented, and therefore the maximum deviation from flatness. The surface tension has been found to be of the order of $9.5 \times 10^{-5}$ lb./in. for lubricating oils. For the example above, substituting in the equation $$t = \frac{2 \times 9.5 \times 10^{-5}}{4.33} = 4.38 \times 10^{-5} \text{ in.}$$

One interference light band of helium is $1.16 \times 10^{-5}$ in.; so theoretically, imperfections of about 4 light bands can be tolerated. But this, of course, disregards changes in surface tension due to temperature, kind of lubricant, irregularities not detected by the optical flat, the possibility of imperfections in the two faces being adjacent, etc.

*Experimental Determination of Flatness Requirements*

The above theoretical consideration is checked by experiment. For example, sixteen pairs of faces were lapped to varying degrees of flatness ranging from 2 to 5 light bands of helium. These pairs were checked with a control plug that was the same size as the parts being lapped. Each pair of faces was set up in a seal test assembly and run for 30 minutes. Records were maintained on leakage and time for all pairs.

All the faces lapped to a flatness within 3½ helium light bands sealed without failure. All the faces lapped to a flatness of 4 light bands or greater leaked. The faces lapped to flatness between 3½ and 4 light bands were not dependable; some did not leak, but others did. These experiments indicate that the factors neglected in the theoretical consideration mount up, and that the faces should be lapped to a flatness within 3½ helium light bands.

*Other Considerations Concerning Flatness*

For many purposes, the flatness of the face means little if measured in the free state. What is important is that the sealing faces be flat when they are in actual contact with each oher under actual sealing conditions. Thus, two previously flattened faces formed on sheet metal flanges may be pressed to flatness if not quite flat already, and the flanges of the face seals of this invention are subject to this flattening action by the spring element of the face seal. Therefore, the flatness of the faces is preferably measured under the same conditions under which they will operate, in order to determine how flat they will be when they are in operating position.

The present invention incorporates as one factor thereof a preferable method of obtaining a flat face. In this method, the sheet-metal face flanges are spring (or otherwise) loaded during the lapping or grinding processes (whether before the dry film coating or after the ceramic coating) to the same degree that they will be loaded by the spring during actual service. In other words, the spring pressure on the faces should duplicate the pressure to which they are subjected when they are being lapped. Due to the relatively low sectional rigidity of the sheet metal faces as compared with solid, thick, metal members such as solid bar stock machined to provide the face, the degree of out-of-flatness would tend to be much more than that permissible when the faces are not loaded, but by using this process the flatness under opearting conditions can be held within the desired range.

*Theoretical Consideration of the Effects of Vibration on Face Seal Components*

If a shaft upon which one element of a face seal is mounted does not run exactly true, or if there are other sources of vibration, the faces of the seal are subjected to a forced vibration having a frequency of one cycle per revolution of the shaft, or as determined by the external source of vibration. This vibration will be damped somewhat, but usually not very much, so a curve having a resonance peak will result if the ratio of the amplitude of vibration to the deflection caused by a static force of the same magnitude as that causing the vibration, is plotted against the ratio of the frequency of the vibration to the lowest natural frequency of vibration of the system. Such a curve may be found in any standard text on vibrations, e.g., at page 65 of Mechanical Vibrations by W. T. Thompson. The resonance peaks of these curves show that there will be trouble if the exciting frequency is equal to or very close to the lowest natural frequency of the system.

The lowest natural frequency of vibration of a ring is given by the equation $$f_2 = \sqrt{\frac{KI}{Ar^4}}$$

where
$f_2$ is the lowest natural frequency of the ring,
K a constant depending on the material from which the ring is made,
I is the moment of inertia of the section about the appropriate axis,
A is the cross-sectional area, and
$r$ is the radius to the centroid of the section.

It is impractical for the raito of actual frequency, $f_a$, to $f_2$ to be substantially greater than 1, for this could be obtained only by rings with a very large radius or very low moment of inertia compared to the area. Large radii are generally undesirable and a ring having a low moment of inertia along the plane of the ring has a high moment of inertia along an axis perpendicular to the plane of the ring, and vibrations along both axes are important.

When operating where $f_a/f_2$ is less than 1, satisfactory operation can be obtained where $f_a/f_2$ is less than one-half; or in other words, where the lowest natural frequency of the face seal is at least twice the maximum shaft revolution frequency. By this means, as the referred-to-curves show, the magnification of vibrations can be kept between 1 and 1.3.

Successful operation in this range requires that the radius of the ring be small and that the section have adequate stiffness in both directions with a minimum of area. The flanged sheet metal face sealing elements of this invention meet these requirements very well, even better than solid-body face sealing elements of comparable radius and face area.

For example, the lowest natural frequency of vibration perpendicular to the plane of a ring can be given by the equation $$f_2 = \frac{1}{2\pi}\sqrt{\frac{EI}{A\rho r^4}\frac{36}{5+\mu}}$$

where
$f_2$ is the lowest natural frequency
E is the modulus of elasticity
I is the moment of inertia about an axis through the centroid of the section and perpendicular to the direction in which the ring vibrates
$\rho$ is the mass density of the ring
A is the section area
$r$ is the radius to the centroid of the section
$\mu$ is Poisson's ratio The lowest natural frequency of vibration in the plane of the ring is:

$$f_2 = \frac{1}{2\pi}\sqrt{\frac{36EI}{5A\rho r^4}}$$

As a specific example, take a face seal wherein 0.060"

sheet steel is used and wherein the inner diameter of one face element is 2.328", where it has a flange .312" wide, and a short recurved flange .065" long, parallel to a flange .328" long, and a base flange .190" wide held rigidly to a case. Its lowest natural frequency of vibration in the plane of the ring may be calculated as indicated above, and will be found to be 120,600 cycles per minute. Its lowest natural frequency perpendicular to the plane of the ring is similarly found to be 92,700 cycles per minute—both of which are many times as great as the maximum shaft speed for which these seals are designed.

In the matching face element the lowest natural frequency of vibration in the plane of the ring was found to be 137,700 cycles per minute and, perpendicular to the plane, is 66,000 cycles per minute. Thus, these sheet metal face seals will not be greatly affected by such vibrations, at the frequency of shaft rotation.

To those skilled in the art to which this invention relates, many additional changes in construction and widely differing embodiments of the invention will suggest themselves without departing from the spirit and scope of the invention as defined in the claims.

What is claimed is:

1. A method for making face seals from two annuli of sheet metal comprising the steps of flanging said annuli to provide radial faces supported by axially extending portions that increase the sectional rigidity to a value within predetermined limits, said axially extending portions extending out from the faces in opposite directions; coating said faces with an abrasion-resistant and lubricity-imparting layer; flattening said layer to within four light bands of helium light by removing a portion thereof while imposing axial forces on the radial faces; and holding said flattened faces in sealing contact with each other by axial forces substantially duplicating those imposed during flattening.

2. A method for making face seals from two annuli of sheet metal comprising the steps of flanging said annuli to provide radial faces supported by axially extending portions that increase the sectional rigidity to a value within predetermined limits; coating said faces with an abrasion-resistant and lubricity-imparting layer of ceramic whose principal ingredient is chosen from the group consisting of aluminum oxide, titanium oxide, zirconium oxide, and zirconium silicate; flattening said layer to within four bands of helium light by removing a portion thereof while imposing axial forces on the radial faces; and holding said flattened faces in sealing contact with each other by axial forces substantially duplicating those imposed during flattening.

3. A method for making face seals from two annuli of sheet metal comprising the steps of flanging said annuli to provide radial faces supported by axially extending portions that increase the sectional rigidity to a value within predetermined limits; coating said faces with an abrasion-resistant and lubricity-imparting layer of metal chosen from the group consisting of molybdenum, aluminum-iron bronze, and high-chrome stainless steel; flattening said layer to within four bands of helium light by removing a portion thereof while imposing axial forces on the radial faces; and holding said flattened faces in sealing contact with each other by axial forces substantially duplicating those imposed during flattening.

4. A method for making face seals from two annuli of sheet metal, comprising the steps of flanging said annuli to provide radial faces supported by axially extending portions that increase the sectional rigidity to a value within predetermined limits; flattening said radial faces to within four light bands of helium light by removing a portion thereof while imposing axial forces on the radial faces; coating said faces with an abrasion-resistant and lubricity-imparting layer; and holding said flattened coated faces in sealing contact with each other by axial forces substantially duplicating those imposed during flattening.

5. A method for making face seals from two annuli of sheet metal, comprising the steps of flanging said annuli to provide radial faces supported by axially extending portions that increase the sectional ridigity to a value within predetermined limits; flattening said radial faces to within four light bands of helium light by removing a portion thereof while imposing axial forces on the radial faces; coating said faces with an abrasion-resistant and lubricity-imparting layer of a suspension in a mixture of vinyl and phenolic resins of material chosen from the group consisting of molybdenum sulfide, graphite and mixtures thereof; and holding said flattened coated faces in contact with each other by axial forces substantially duplicating those imposed during flattening.

6. A method for making face seals from two annuli of sheet metal, comprising the steps of flanging said annuli to provide radial faces supported by axially extending portions that increase the sectional rigidity to a value within predetermined limits; flattening said radial faces to within four light bands of helium light by removing a portion thereof while imposing axial forces on the radial faces; coating said faces with an abrasion-resistant and lubricity-imparting layer of a metallic salt chosen from the group consisting of the sulfides and sulfocyanides under heat sufficient to convert a portion of the face to a sulfide; and holding said flattened coated faces in contact with each other by axial forces substantially duplicating those imposed during flattening.

7. A method for making a face seal member from an annulus of sheet metal, comprising the steps of flanging said annulus to provide a radial face supported by an axially extending portion that increases the sectional rigidity to a value within predetermined limits; coating said face with an abrasion-resistant and lubricity imparting layer; flattening said layer to within four bands of helium light by removing a portion thereof while applying axial force thereto; and applying on said face in service an axial force equal to that applied during flattening.

8. A method for making a face seal member from an annulus of sheet metal, comprising the steps of flanging said annulus to provide a radial face supported by an axially extending portion that increases the sectional rigidity to a value within predetermined limits, flattening said face to within four bands of helium light by removing a portion thereof, while applying axial force thereto; coating said face within an abrasion-resistant and lubricity imparting layer; and applying to said face during service an axial force equal to that applied during flattening.

References Cited in the file of this patent

UNITED STATES PATENTS

| | | |
|---|---|---|
| 1,710,064 | Mummert | Apr. 23, 1929 |
| 1,999,599 | Smith | Apr. 30, 1935 |
| 2,076,716 | Fretter | Apr. 13, 1937 |
| 2,581,301 | Saywell | Jan. 1, 1952 |